(12) United States Patent
Shrinkle

(10) Patent No.: US 6,239,935 B1
(45) Date of Patent: *May 29, 2001

(54) METHOD AND APPARATUS FOR STARTING A HARD DISK DRIVE HAVING SEPARATE LANDING AND DATA ZONES

(75) Inventor: Louis J. Shrinkle, Leucadia, CA (US)

(73) Assignee: Seagate Technolgy LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/596,532

(22) Filed: Feb. 5, 1996

(51) Int. Cl.$^7$ .................................................. G11B 21/02
(52) U.S. Cl. ............................................ 360/75; 360/78.04
(58) Field of Search ............................... 360/103, 75, 27, 360/78.04, 70, 105, 135, 31, 53

(56) References Cited

U.S. PATENT DOCUMENTS

| | | | |
|---|---|---|---|
| 4,823,212 | 4/1989 | Knowles et al. | 360/77.08 |
| 4,907,106 | * 3/1990 | Yamada | 360/75 |
| 5,062,021 | * 10/1991 | Ranjan et al. | 360/135 |
| 5,545,989 | * 8/1996 | Tian et al. | 324/212 |
| 5,566,095 | 10/1996 | Cameron et al. | 364/571.01 |
| 5,587,850 | 12/1996 | Ton-that | 360/77.08 |
| 5,594,595 | * 1/1997 | Zhu | 360/103 X |
| 5,729,399 | * 3/1998 | Albrecht et al. | 360/75 |

FOREIGN PATENT DOCUMENTS

0166385 * 6/1989 (JP) ........................................ 360/75

* cited by examiner

Primary Examiner—Andrew L. Sniezek
(74) Attorney, Agent, or Firm—Merchant & Gould P.C.

(57) ABSTRACT

A contact start/stop architecture for disk drives overcomes problems introduced by low flying MR (magnets resistive) heads and textured landing zones. Takeoff velocity for heads vary from the textured landing zone to the data zone. Contact start/stop operations are controlled relative to a critical takeoff velocity between takeoff velocity in the data zone and takeoff velocity in the landing zone, which critical velocity is less than that required to achieve negligible contact between the head and disk surface while the head is within the landing zone, but greater than takeoff velocity within the data zone. An initial seek from the landing zone begins at critical takeoff velocity. The head drags along the disk surface in the landing zone, since it has not reached takeoff velocity within the landing zone, but will immediately be at fly height as soon as the head reaches the data zone, minimizing the total drag distance of the head in the landing zone. A similar control scheme is used during a contact stop operation with respect to the head's landing velocity, which is equal to takeoff velocity. During contact stop operations, the actuator arm retracts the head into the landing zone at critical takeoff velocity. The servo control for initial seek from the landing zone utilizes back EMF (elecromative force) from the actuator voice coil motor without relying on servo information read by the MR head while the head is within the landing zone, since the MR head cannot accurately transduce magnetic transitions on rough surfaces.

10 Claims, 11 Drawing Sheets

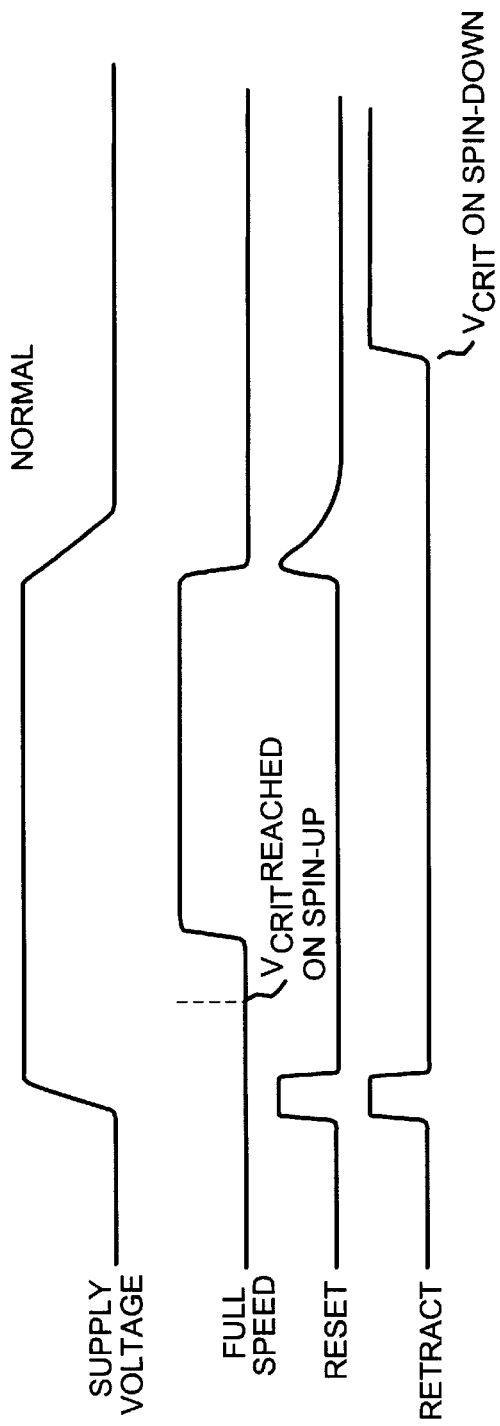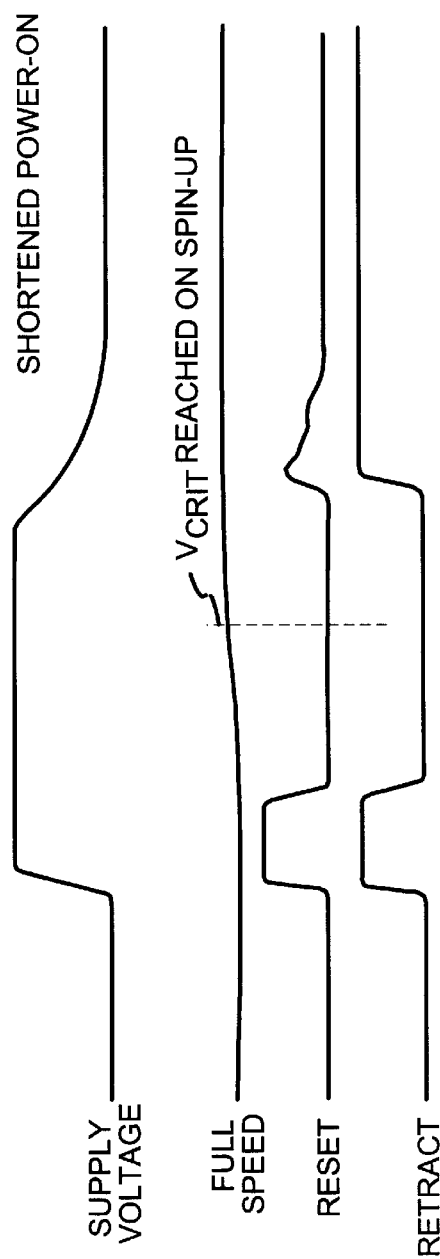

METHOD AND APPARATUS FOR STARTING A HARD DISK DRIVE HAVING SEPARATE LANDING AND DATA ZONES

FIELD OF THE INVENTION

The present invention is directed to disk drives. More particularly, the present invention provides an architecture for implementing contact start and stop operations (CSS) in a high data density disk drive product utilizing a magnetoresistive head and a zone texture media.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter.

Each of the data tracks extends generally circumferentially around the disk and can store data in the form of magnetic transitions within the radial extent of the track on the disk surface. An interactive element, such as a magnetic transducer, is used to sense the magnetic transitions to read data, or to transmit an electric signal that causes a magnetic transition on the disk surface, to write data. The magnetic transducer includes a read/write gap that contains the active elements of the transducer at a position suitable for interaction with the magnetic surface of the disk. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disk to either read data from or write data to the preselected data track of the disk, as the disk rotates below the transducer. The actuator arm is, in turn, mounted to a voice coil motor that can be controlled to move the actuator arm across the disk surface.

A servo system is typically used to control the position of the actuator arm to insure that the head is properly centered over the magnetic transitions during either a read or write operation. In a known servo system, servo position information is recorded on the disk surface between written data blocks, and periodically read by the head for use in a closed loop control of the voice coil motor to position the actuator arm. Such a servo arrangement is referred to as an embedded servo system.

In modern disk drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disk surface due to fluid currents caused by rotation of the disk. Thus, the transducer does not physically contact the disk surface during normal operation of the disk drive to minimize wear at both the head and disk surface. The amount of distance that the transducer flies above the disk surface is referred to as the "fly height." By maintaining the fly height of the head at an even level regardless of the radial position of the head, it is ensured that the interaction of the head and magnetic charge stored on the media will be consistent across the disk.

It is expected that users of disk drives will place ever greater demands on disk drive manufacturers with regard to the amount of data that can be stored in and rapidly retrieved from disk drive products. Modern software programs include graphics and other data structures that dramatically increase the amount of data that need to be stored. In addition, the rapid growth in the use of servers on computer networks requires large storage capabilities to accommodate the data needs of a large number of users on the network who utilize the servers.

Accordingly, recent disk drive research and development efforts have focused on the need to continually improve, among other things, the magnetic media used in the disks so as to substantially increase the storage capacity of each new disk drive design to levels sufficient to accommodate the ever greater demands for storage capacity placed on disk drive products by users. The trend in media design is to develop magnetic materials capable of storing magnetic transitions at ever greater densities, both radially and circumferentially, to achieve a total data storage capacity that is greater than heretofore available.

As noted above, due to operation of the air bearing surface, the transducer does not physically contact the disk surface during normal read and write operation of the disk drive. However, it is generally an objective to achieve an overall fly height that brings the read/write gap of the transducer as close to the disk surface as possible. The closer the active read/write gap of the transducer is brought to the surface of the disk, the stronger the electric signal generated by the transducer due to a magnetic transition on the disk surface which represents data. It is generally advantageous to develop as strong a data signal as possible, to insure reliable electrical performance of the disk drive.

Continuing advances in disk drive design that permit lower fly heights make it feasible to further increase the density of magnetic transitions since the smaller transitions that result from greater densities, as measured by the radial and circumferential extent of each transition, can be adequately sensed by the low flying head. A consequence of the increasing capacity of disk drive products having compact designs is that data densities on the surface of the disks and the rotational speeds of the disks are approaching levels that are too high relative to the capability of conventional magnetic transducers to rapidly and accurately sense closely spaced, fast moving magnetic transitions in a data read operation, even at low fly heights.

One proposal to meet the data retrieval requirements of modern disk drive designs is to utilize a magnetoresistive transducer (MR transducer) coupled to an electronic read channel that implements signal processing techniques such as partial response, maximum likelihood detection (PRML read channel). These components provide significantly improved performance capabilities and are able to process signals representative of data at rates suitable for operation with modem high capacity, high performance disk drives.

In an MR head, the transducer comprises a magnetoresistive element that is used to sense the magnetic transitions representing data. The magnetoresistive element comprises a material that exhibits a change in electrical resistance as a function of a change in magnetic flux of a magnetic field applied to the element. In a disk drive environment, the MR element is positioned within the transducer gap, above a disk surface. In this position, the electrical resistance of the element changes in time as magnetic transitions recorded on the disk pass beneath the gap, due to rotation of the disk. The changes in the resistance of the MR element caused by magnetic transitions on a disk occur far more quickly than the response of conventional transducers to magnetic transitions. Thus, an MR transducer is able to sense magnetic transitions at higher rotational speeds and data densities.

The MR transducer is coupled to an electronic circuit, e.g. a pre-amplifier, that operates to detect the resistance changes of the MR element, and generate electrical signals that vary in time as a function of the resistance changes. The pre-amplifier output, therefore, comprises an electrical signal that corresponds to the data recorded as magnetic transitions on the disk surface. The output of the pre-amplifier is coupled to a read channel that thereafter processes the preamplifier output signal according to PRML techniques to interpret the data represented by the output signal. PRML techniques can operate with more efficient data recording codes, and are able to process signals at more rapid rates than conventional peak detectors now widely used in disk drives to detect data from signals received from a transducer.

When the disk drive is not operating, the rotation of the storage disk is stopped, and the air bearing surface of the head ceases to cause the transducer to fly. Under such circumstances, the head, including the transducer, comes to rest on the disk surface. Typically, the actuator arm is operated during power down of the disk drive, to position the head over a landing zone provided on the disk surface away from any of the data tracks. In conventional disk drive products, the landing zone is most often placed at the inner diameter of the disk. The actuator arm is latched when positioned over the landing zone.

In a known contact stop operation of a disk drive, the head comes into contact with the disk surface over the landing zone upon the slowdown and cessation of rotation of the storage disk due to power down of the disk drive. The use of a landing zone prevents any damage to data tracks that may occur due to contact between the head and the disk surface.

A contact start operation, at power up of the disk drive, causes the commencement of rotation of the disk while the head is still in contact with the landing zone. A phenomenon known as "stiction" between the head and the landing zone is a potential problem in a contact start operation. Stiction resists separation between the head and disk surface and can be highly detrimental to disk drive operation. Indeed, the stiction between the disk surface and the head can be so significant that the spindle motor cannot generate sufficient torque to separate the head from the disk surface at all, resulting in a disk drive failure.

When operating at extremely low fly heights, the smoothness of disk surfaces becomes an important design issue. Peaks and valleys in the disk surface, even if of minimal dimensions, can interfere with contact free flying operation of a head when the head is flying at a fly height that is in the same relative dimension range as the peaks and valleys encountered on a disk surface. Thus, another goal of modern disk design is to improve the smoothness characteristics of disk surfaces such that peak and valley dimensions are minimal relative to the low head fly height. However, the greater the smoothness of a disk surface, the greater the potential for unacceptable stiction between the head and disk surface.

A proposed solution to the stiction problem resulting from extremely smooth disk surfaces is to texture the surface of the landing zone. A textured surface increases the roughness of the surface to thereby reduce stiction between the head and disk surface. Thus, the data track portions of the disk are formed to an extremely smooth surface to facilitate a low fly height for an MR head, while the landing zone is formed to a rough surface such that stiction is minimized during a contact start operation.

In a conventional disk drive, the landing zone typically includes a track or tracks containing servo information that is used to provide initial head position information. During the contact start operation, when the head has reached a take-off velocity, the head is activated to read the servo information. The head is then positioned by the actuator arm over the landing zone track, using the recorded servo information as a servo lock. The initial controlled position is a starting point reference to control further radial movement of the actuator arm in an initial seek from the landing zone servo track back out to the data track portions of the disk. In this manner, the actuator arm is moved form the landing zone to a position over a preselected one of the data tracks in a controlled operation.

Absent the use of servo control during the time of the initial seek out of the landing zone, the actuator arm would move blindly, without closed loop control over its speed or position. Under such circumstances, the actuator arm may hit a crash stop provided to limit the radial extent of actuator arm movement, before control is attained over actuator arm movement. This can result in mechanical shock to the actuator arm that causes irreparable damage to the head and/or the media. A problem with the use of a textured landing zone in a disk drive implementing a low fly height MR head is that the MR element cannot reliably transduce transitions recorded on a rough surface when the head is flying at a relatively low fly height. This is due to thermal asperity caused when the MR head contacts the media. Thus, a stable initial seek based upon a servo lock on a landing zone servo track cannot be assured, leaving the disk drive vulnerable to crash stop hits.

Moreover, while the rough surface of the landing zone minimizes stiction problems, the flyability of the head over the rough surface is poor, particularly in a low fly height environment, making the time of flight over the landing zone a significant concern to long work life prospects for the disk drive. The conventional contact start approach of staying in the landing zone until a satisfactory take-off velocity has been achieved by the head can result in excessive time in the rough landing zone causing accelerated wear of the head. A similar problem occurs during a contact stop operation when the head is retracted into the landing zone too far in advance of landing on the rough disk surface.

Accordingly, the significant advances contemplated for disk drive designs raise a new set of problems affecting the robustness of disk drive operation. The use of MR heads with textured media enable an important advance in data storage capacity and speed of operation of the disk drive. However, the resulting loss of control of head movement during an initial seek out of the landing zone at power up of the drive and undue wear on the head caused by excessive time within the textured landing zone can lead to premature disk drive failure.

SUMMARY OF THE INVENTION

The present invention provides a contact start and stop architecture (CSS) for a disk drive that overcomes the problems introduced by the use of a low flying MR head and a textured landing zone media. Generally, the architecture according to the present invention recognizes that take-off velocity characteristics relevant to the head vary as between the rough surface of the textured landing zone and the smooth surface of the data track zone of the disk.

The take-off velocity is the rotational velocity of the disk at which the air bearing surface first acts to lift the head from the disk surface to a point where contact between the slider and the disk surface is negligible. The rough surface of the landing zone includes peaks and valleys having dimensions that result in a relatively high take-off velocity for the head. In contrast, the smooth surface of the data track portions or zone of the disk permits a lower fly height level, and thus a lower velocity, at which a take-off condition is achieved.

According to the present invention, contact start and stop operations are controlled with reference to a critical take-off velocity selected at a rotational velocity of the disk that is between the take-off velocity value in the data zone and the take-off velocity value in the landing zone. The critical value is therefore less than required to achieve negligible contact between the head and disk surface while the head is positioned within the landing zone, but greater than the take-off velocity within the data zone.

During a contact start operation, an initial seek out of the landing zone is controlled to begin at a rotational velocity of the disk equal to the critical take-off velocity. Thus, the head is still dragging along the disk surface in the landing zone, since it has yet to reach the take-off velocity within the landing zone, but will immediately be at a fly height as soon as the head is moved into the data track zone, since the critical velocity is greater than the take-off velocity within the smooth data track zone. In this manner, the total drag distance of the head in the landing zone is minimized because the head is removed from the landing zone prior to the time it would ordinarily reach a fly height had the head remained in the landing zone. In other words, the head would have continued to drag along the landing zone surface until it finally reached the take-off velocity for the landing zone, contributing to wear on the head.

Moreover, the transition between dragging and flying is accomplished immediately, as soon as the head reaches the data track zone, rather than the more gradual transition that would occur had the head remained in the landing zone until fly height was reached. It is believed that the most destructive wear on a head occurs at the transition between dragging and fly height, which is minimized in length of time pursuant to the present invention.

Thus, the critical velocity concept of the present invention reduces both the total drag time of the head in the landing zone and the time of transition between dragging and flying, to minimize wear on the head. At the same time, full advantage is taken of a textured landing zone since stiction is of greatest concern at the beginning of the contact start operation, when the head and disk surface are initially at stationary contact. Stiction is substantially overcome as soon as the spindle motor is able to rotate the disk and induce relative movement between the head and disk. The rough surface of the landing zone reduces the stiction between the head and disk surface to reliably achieve rotation of the disk. After rotation has begun, the rough surface contributes to wear on the head. However, the present invention provides for a limited use of the textured landing zone, to minimize stiction, and thereafter causes the head to be removed from the landing zone as soon as possible, to minimize wear.

A similar control scheme is used during a contact stop operation with respect to the landing velocity of the head. The landing velocity is the rotational velocity of the disk at which a head first contacts a disk surface. Typically, the landing velocity of a head is equal to the take-off velocity. According to the present invention, during a contact stop operation, the actuator arm is controlled to retract the head into the landing zone at the critical take-off velocity. A retract logic circuit is provided to detect the time at which the disk has spun down to the critical velocity and thereafter control retract operation of the actuator voice coil motor.

Thus, as in the case of an initial seek out of the landing zone, the time the head is first moved into the landing zone is designed to minimize the total time the head is within the landing zone prior to the disk coming to a complete stop. The head is first positioned in the landing zone while the head is still at a fly height within the data track zone, but just prior to reaching the landing velocity within the landing zone.

Pursuant to another feature of the present invention, the initial seek out of the landing zone is undertaken with a servo control that utilizes a back EMF from the actuator voice coil motor. In this manner, there is no need to rely upon servo information read by the MR head while the head is within the landing zone and unable to accurately transduce magnetic transitions on the rough surface.

A back EMF is an electric voltage generated by the rotation of components of a conventional electric motor, such as the rotor, and varies in signal strength and shape as a function of the rotational velocity and direction of the rotating components. According to the present invention, the back EMF signal from the voice coil motor is monitored and used to calculate head position during the initial seek for a controlled and stable arrival of the head within the data track zone of the disk. Once the head is within the data track zone, a servo lock logic circuit is used to attain a servo lock on servo information recorded in the servo sectors of the data tracks.

BRIEF DESCRIPTION OF THE DRAWINGS

FIG. 13 is a timing diagram illustrating the operation of the retract logic control system of FIG. 12 during normal power down.

FIG. 14 is a timing diagram illustrating the operation of the retract logic control system of FIG. 12 during a shortened power-on.

DETAILED DESCRIPTION

Figure 1:
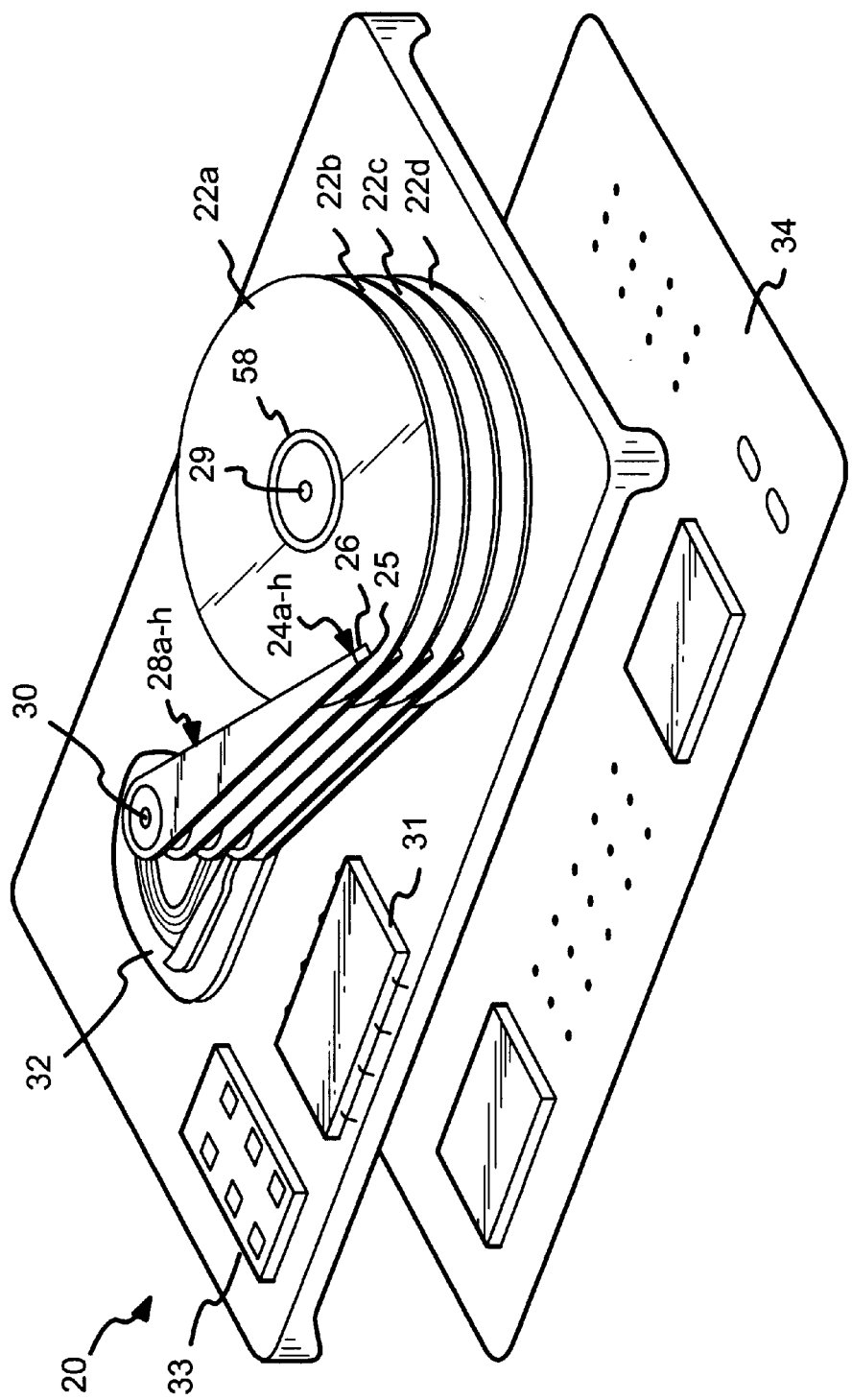
FIG. 1 is perspective view of an exemplary disk drive.

Referring now to the drawings, and initially to FIG. 1, there is illustrated an example of a disk drive designated generally by the reference numeral 20. The disk drive 20 includes a stack of storage disks 22a–d and a stack of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. The heads are coupled to a pre-amplifier 31. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage disks 22a–d. The manner for coupling the PCB 34 to the various components of the disk drive is well known in the art, and includes a connector 33 to couple the read/write channel circuitry to the pre-amplifier 31.

Figure 2:
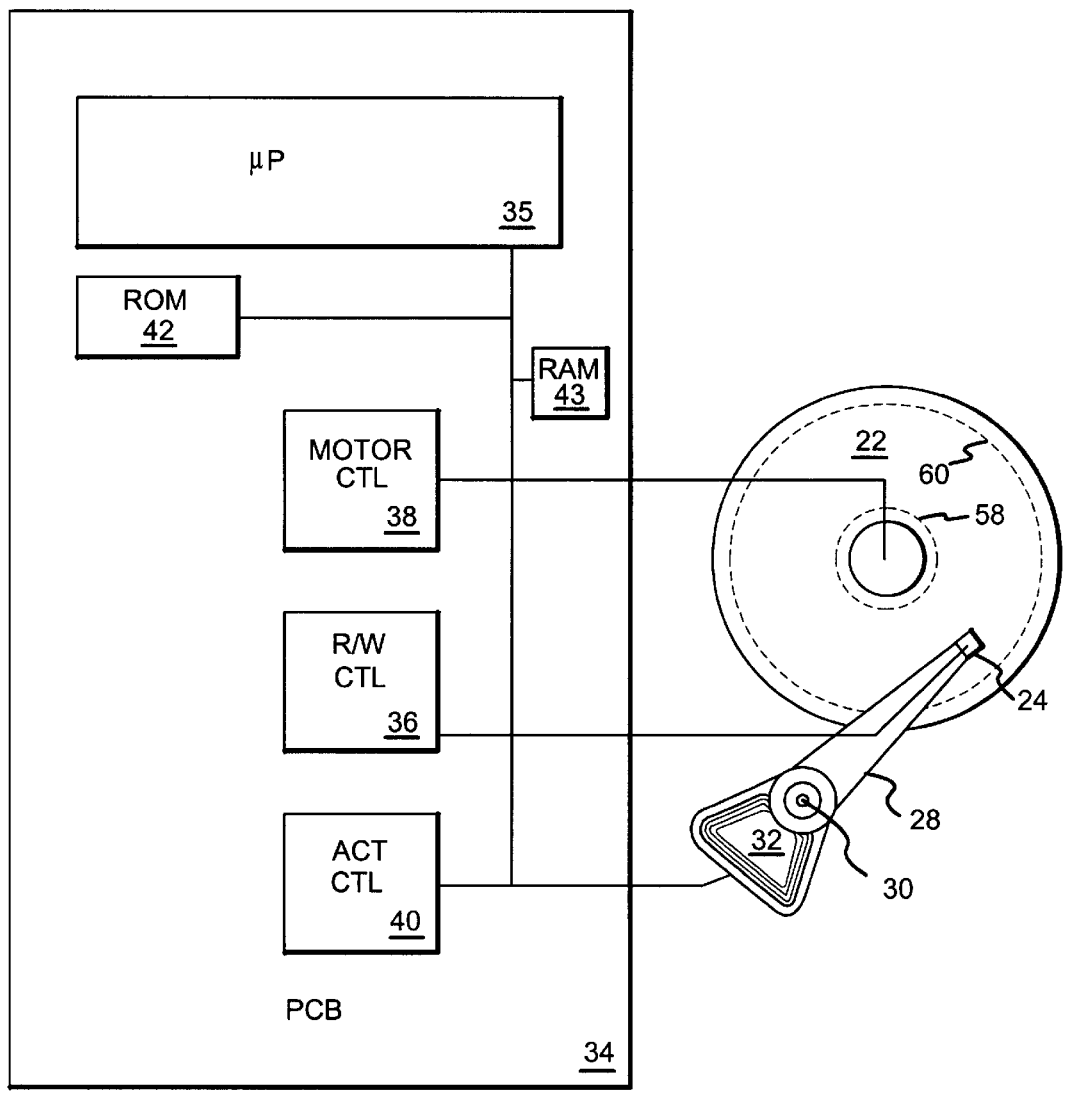
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and radial speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage disks 22a–d via the read/write control 36. The buffered data can be transferred to or from a host computer utilizing the disk drive for data storage.

Figure 3:
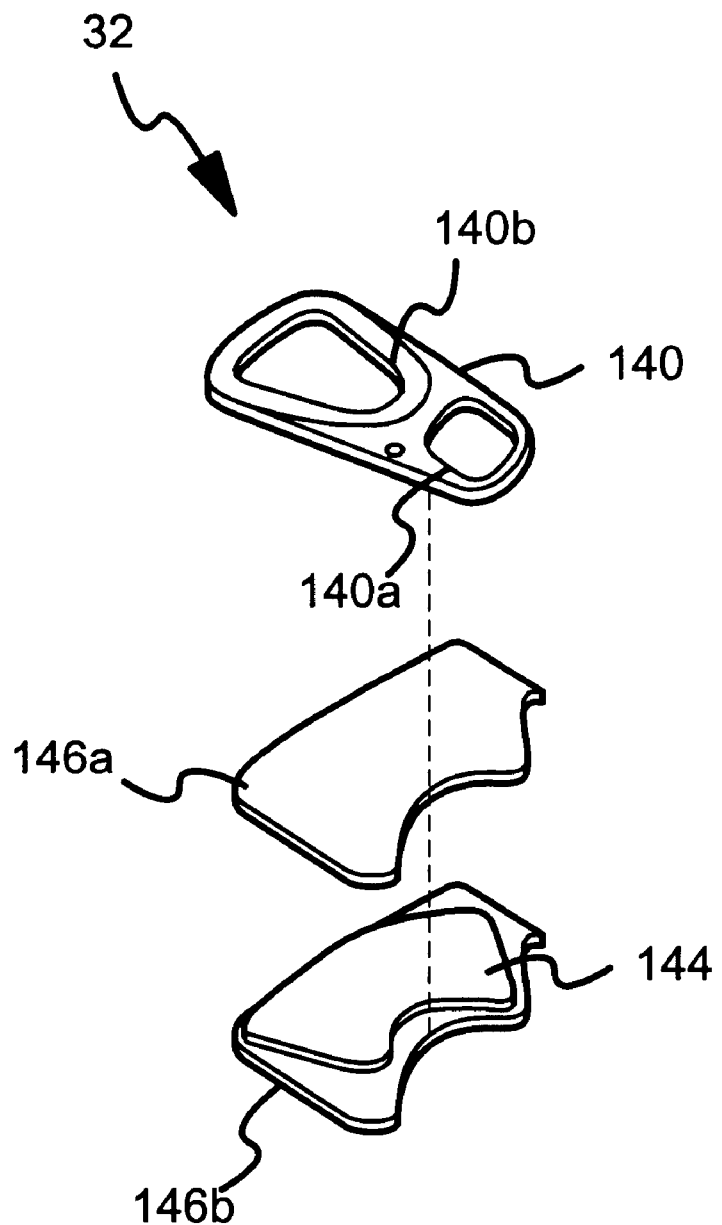
FIG. 3 is an exploded view of components of the actuator arm voice coil motor of the disk drive of FIG. 1.

Referring now to FIG. 3, there is shown an exploded view of certain conventional components of the voice coil motor 32 relevant to the present invention. An electric coil element 140 includes an opening 140a that is received over the pin 30 and arranged between two actuator arms 28, in a known manner. The electric coil element 140 includes an electric coil portion 140b that is positioned between two plates 146a,b mounted within the disk drive 20. A permanent magnet 144 is secured to one of the two mounting plates 146a,b such that the magnetic field of the permanent magnet 144 interacts with a magnetic field generated by the electric coil portion 140b upon the application of a voltage to the coil by the actuator control 40, as described above. The magnetic interaction between the coil portion 140b and the permanent magnet 144 causes movement of the electric coil element 140 to thereby rotate the pin 30 and move the actuator arms 28a–h as a function of the magnitude and direction of the applied voltage. Consequently, application of a controlled voltage can be used to position the heads 24a–h over any preselected data track.

Figure 4:
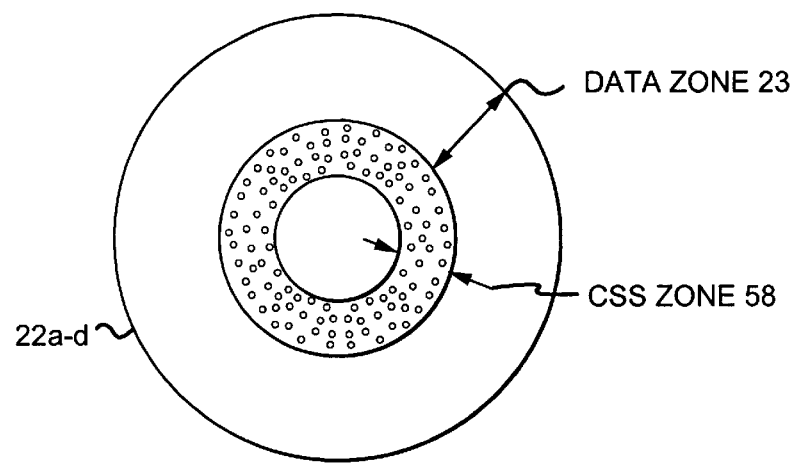
FIG. 4 is a top plan view of a disk from the disk drive of FIG. 1.
Figure 5:
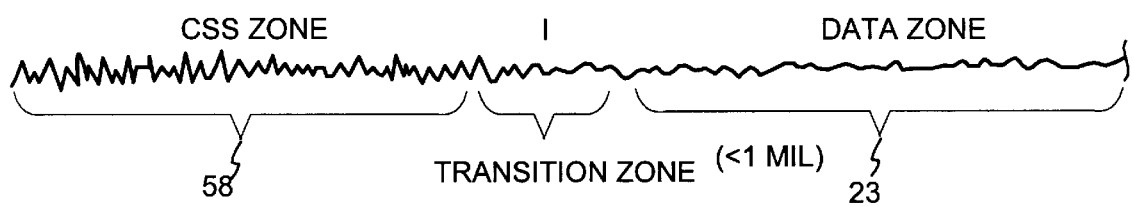
FIG. 5 is a side view of the surface of the disk of FIG. 4.

FIG. 4 is a top plan view of a representative disk 22a–d of the disk drive 20 implemented as a textured disk. As shown in FIG. 4, the landing zone 58 is shaded to represent a rough surface, while the remaining portion of the disk, labeled "data zone" and designated by the reference numeral 23, is finished to a relatively smooth surface to accommodate a low fly height MR head. The relative roughness of the disk surface is shown schematically in FIG. 5. The transition region 1 between the landing zone 58 and data zone 23 as depicted in FIG. 5 is also relatively rough as compared to the data zone 23. The jagged line depicted in FIG. 5 illustrates peaks and valleys in the disk surface.

As clearly shown in FIG. 5, the height of the peaks and depth of the valleys in the landing zone 58 are of significantly greater dimensional magnitudes than those formed in the surface of the data zone 23. The roughness of the surface within the landing zone 58 is formed to cause friction between the head and the rough surface of the landing zone to be at a level sufficient to minimize stiction during a contact start operation. Roughness allows sufficient atmosphere between head and disk to prevent stiction. Within the data zone 23, the smooth surface facilitates an even, low level fly height for the head.

In a conventional disk drive design, the disk is accelerated to a rotational velocity at which fly height begins, i.e., the take-off velocity, before the head is moved out into the data zone 23. Thus, the total distance the head is in contact with the rough surface of the landing zone 58 is at a maximum length. The present invention is directed to minimizing this length or time.

Figure 6:
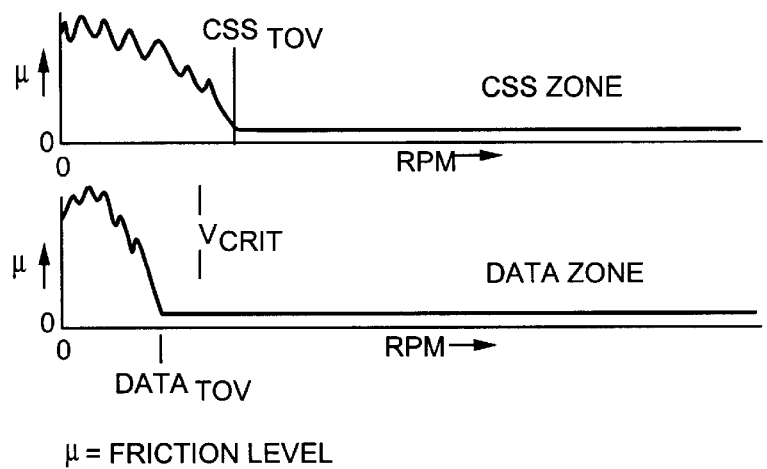
FIG. 6 is a set of two graphs showing head/disk friction versus rotational velocity of the disk of FIG. 4, and illustrating a critical take-off velocity according to the present invention.

FIG. 6 contains a set of two graphs that show head/disk friction versus rotational velocity of the disk of FIG. 4 within each of the landing and data zones, respectively. The top graph of FIG. 6 shows friction levels ($\mu$) between the head and disk surface before and after a take-off velocity ($CSS_{TOV}$) is reached within the landing zone upon power up of the drive. The bottom graph shows the friction levels ($\mu$) before and after a take-off velocity ($DATA_{TOV}$) is reached within the data zone. A comparison of the two graphs shows that the friction levels within the landing zone (before the take-off velocity $CSS_{TOV}$ is reached) remain at a higher level for a longer period of time than the friction levels within the data zone, prior to take-off velocity $DATA_{TOV}$. This indicates that $CSS_{TOV}$ is at a higher rotational velocity of the disk than $DATA_{TOV}$. Consequently, when a conventional contact start operation is performed, a head is subjected to contact drag along the rough surface up to a rotational velocity that is higher than necessary to achieve fly height within the data zone 23, causing excessive wear on the head.

According to a feature of the present invention, a critical take-off velocity $V_{CRIT}$ is selected from a range of rotational velocities between $DATA_{TOV}$ and $CSS_{TOV}$. The concept underlying the selection of $V_{CRIT}$ is to begin an initial seek out of the landing zone at a rotational velocity of the disk when the head is still dragging the surface of the landing zone 58, but is instantly at a fly height as soon as the head is moved into the data zone 23. The use of $V_{CRIT}$ as a starting parameter for initialization of a seek into the data zone 23 takes full advantage of the rough surface to minimize stiction during a contact start operation, but minimizes wear on the head by limiting the drag length within the landing zone 58.

Figure 7:
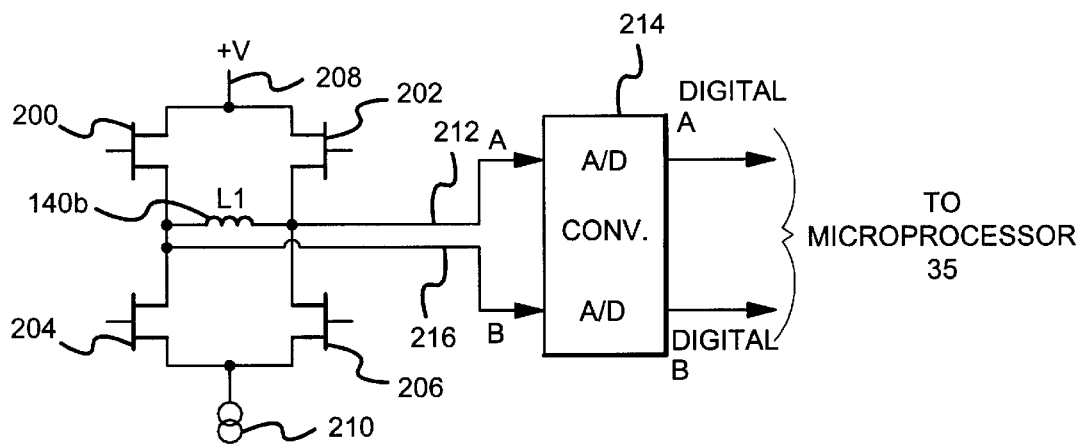
FIG. 7 is a circuit diagram of the initial seek servo control system according to the present invention.

Pursuant to another feature of the present invention, control of head movement during the initial seek from the landing zone to the data zone is based upon measurement of a back EMF from the electric coil portion 140b. Referring now to FIG. 7, there is shown a conventional H drive arrangement for the electric coil portion 140b, which is modified according to the present invention for monitoring of back EMF values generated by the coil 140b upon application of a control signal during the initial seek. The H drive circuit comprises an arrangement of four transistors 200, 202, 204 and 206 coupled between a voltage source 208 and a current sink 210. As shown in FIG. 7, the coil 140b is coupled between a first leg of the circuit including transistors 200 and 204, and a second leg including transistors 202 and 206.

According to conventional disk drive design, the transistors 200, 202, 204 and 206 can be controlled to cause application of a drive voltage to the coil 140b in either a left-to-right or right-to-left direction to move the actuator arms 28a–h from an inner diameter of the disks 22a–d toward an outer diameter or vice versa. When a control signal from actuator control 40 causes transistors 200 and 206 to turn on, current will flow from the voltage source 208 to the current sink 210 through the coil 140b from left to right. When the control signal causes transistors 202 and 204 to turn on, current will flow from the voltage source 208 to the current sink 210 through the coil 140b from right to left.

Pursuant to the present invention, a line 212 is coupled to the right side of coil 140b to transmit a signal A, proportional to a back EMF from the coil 140b at the right side of the coil 140b, to an analog to digital converter 214. A line 216 is coupled to the left side of coil 140b to transmit a signal B, proportional to a back EMF from the coil 140b at the left side of the coil 140b, to the analog to digital converter 214. The analog to digital converter 214 outputs digitized A and B signals to the microprocessor 35 for use in controlling the movement of the actuator arms 28a–h, via the actuator control 40, from the landing zone 58 to the data zone 23.

Signals A and B are proportional to and thereby indicate the velocity of the actuator arms 28a–h. The microprocessor 35 can be programmed to integrate the digitized A and B signals to provide actuator position information.

Figure 8:
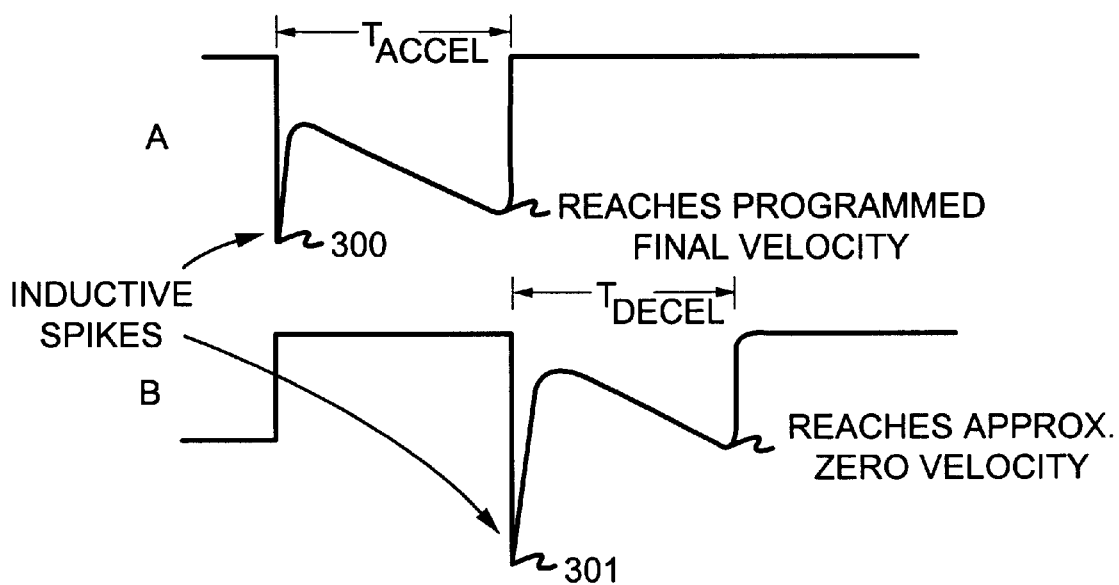
FIG. 8 is a signal diagram for A and B outputs of the circuit of FIG. 7.

FIG. 8 illustrates waveforms for the signals A and B during a seek out of the landing zone 58. When the rotational velocity of the disks 22a–d reach $V_{CRIT}$, the microprocessor 35 asserts a control signal to cause the actuator control 40 to energize the coil 140b of the voice coil motor 32 via the H circuit such that the actuator arms 28a–h are moved toward the data zone 23. The heads 24a–h will be at fly height as soon as they reach the data zone 23.

Upon application of a voltage from the actuator control 40 to energize the coil 140b, an initial voltage spike 300 is generated due to the discontinuity in the voltage caused by the abrupt application of voltage to the coil 140b. This inductive spike 300 gradually decays to zero. When the actuator control 40 reverses the voltage to the coil 140b to decelerate the actuator arm 28, the discontinuity in the voltage generates another inductive spike 301, which again gradually decays.

The time period $T_{ACCEL}$ corresponds to the time necessary for the voice coil motor 32 to accelerate the actuator arms 28a–h to a final velocity at which the actuator arms 28a–h have moved approximately one quarter stroke from the landing zone 58 out over the data zone 23. The final velocity value is programmed into the microprocessor 35. The microprocessor 35 monitors the signal A until the signal strength corresponds to the programmed final velocity, and then reverses the direction of current flow through the coil 140b via appropriate control of the transistors of the H circuit. The reversed current causes a deceleration of the actuator arms 28a–h. The microprocessor 35 monitors the signal B until the signal strength indicates zero velocity has been reached. This will occur at the end of time period $T_{DECEL}$. $T_{DECEL}$ corresponds to the time necessary for the voice coil motor 32 to decelerate the actuator arms 28a–h from the final velocity to zero velocity. At that point, current is shut off to the coil 140b. As ordinarily occurs, the actuator arms 28a–h will then drift to a stable radial position over the data zone 23, typically where there is near zero skew between the heads and data tracks of the data zone 23.

In this manner, the heads 24a–h are controllably moved from the landing zone 58 to the data zone 23 without the need to perform a servo lock while the heads 24a–h are over the rough surface of the landing zone 58. As noted above, when MR heads are used in the disk drive, it is not possible to obtain a reliable servo lock onto a servo track recorded in the landing zone 58. According to the initial seek control scheme of the present invention, the heads 24a–h can be shut off until the heads are stable over the data zone 23.

When the heads 24a–h are drifting over the data zone at near zero skew angle, a servo lock must be performed to obtain control over head position for data read and write operations. In a conventional disk drive, where servo lock is obtained from a servo track recorded in the landing zone, this is a fairly straightforward operation. The conventional landing zone servo tracks comprise simple coherent patterns that are easily detected regardless of the precise radial position of the head within the landing zone, to provide an address mark for orientation of the servo control system.

However, pursuant to the present invention, the heads 24a–h are turned off until they reach a stable position within the data zone 23. The heads are first turned on when the disks 22a–d reach the full operational rotational velocity and a servo lock must be obtained from complex information recorded in the data zone. This can lead to false address mark detections within recorded transitions of data fields, as will now be explained.

Figure 9:
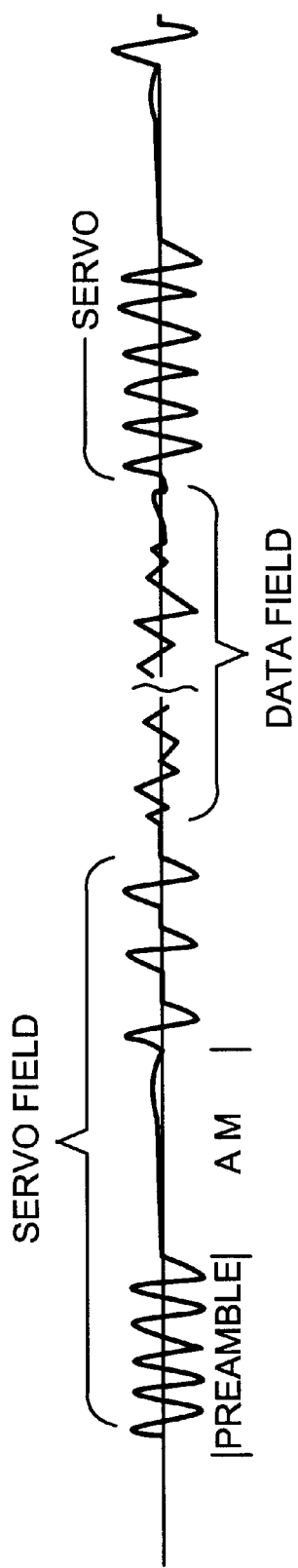
FIG. 9 is a diagram of signals transduced from magnetic transitions recorded on a data track of the disk of FIG. 4.

FIG. 9 provides a diagram of signals transduced from magnetic transitions recorded on a typical data track of the data zone 23. The diagram shows a servo sector followed by a data sector, followed by another servo sector. The servo sectors are identical in format throughout each track and across all of the tracks. Each servo sectors is also radially aligned with servo sectors of adjacent tracks. Each servo sector includes a preamble field, address mark field, Gray code field and servo bursts of the type discussed above for head position control. Because of the radial alignment and similar format, the servo fields are coherent, i.e., they are always present regardless of the radial position of the heads within the data zone.

The preamble field serves as an amplitude reference utilized to normalize an adjustable gain amplifier of the type typically found in a disk drive read channel. The preamble comprises a series of dibits (a positive peak, followed by a negative peak) and is shown as a sine wave in the section labeled preamble in FIG. 9.

The address mark field (AM field) typically comprises an absence of transitions positioned between a preamble and a first transition of the servo information. Thus, the AM field is detected by monitoring the read channel for a window of silence (no transitions detected; shown as a flat signal in the section labeled AM in FIG. 9, between the preamble and the subsequent servo information). The AM silence extends for a range of between two to four bytes, followed by a first magnetic transition of the remaining servo information shown in FIG. 9. The AM field is an asynchronous, absolute timing reference that identifies the beginning of a servo sector and provides the basis for timing the detection of the other fields of the servo sector, including the Gray code and positioning bursts.

The Gray code field contains coded information that indicates the track number where the servo sector is located. This information is used to determine the radial position of an actuator during, e.g. a seek operation, by providing a unique identification for each data track on the respective disk surface.

The reliability of servo signal detection is a significant concern to disk drive designers. In order to insure that the servo sectors are properly processed, the AM field must be precisely and reliably detected to accurately time the location of the Gray code field and servo bursts for head track location and centerline position control. The Gray code field must also be precisely detected for a definitive indication of radial position.

To that end, the servo control system looks for the "silence" corresponding to the absence of transitions as a means for detecting the address mark, as represented by the first transition detected after the silence. A problem encountered when the head is over a data track such as depicted in FIG. 9 (but before being oriented via the servo system) is that the head may read areas of the data field that look like a two to four byte silence. This is because the heads may drift between and read transitions from several adjacent data tracks, each similar to the track depicted in FIG. 9, since the heads are not yet subject to servo control.

Unlike the servo sectors, the data fields are not coherent. Indeed, data fields differ significantly from one another inasmuch as each data field comprises magnetic transitions representative of arbitrary data stored by the host computer. As a head drifts between neighboring data tracks, constructive and destructive combinations of signals from data fields of the tracks can cancel each other out for significant lengths of data track. This occasionally results in a detection by the head of two to four bytes of silence. Accordingly, there is a distinct statistical possibility of a false AM detection based upon two to four bytes of data signals of neighboring tracks that cancel each other out. As should be understood, a false AM detection causes a false orientation of the actuator arms 28a–h.

The servo lock scheme according to the present invention minimizes the statistical possibility of a false AM detection by first detecting a preamble field of a servo sector. Each preamble field comprises a fixed number of dibits that are recorded at a constant frequency. Moreover, the set of preambles, like all of the fields of the servo sectors, are coherent.

Figure 10:
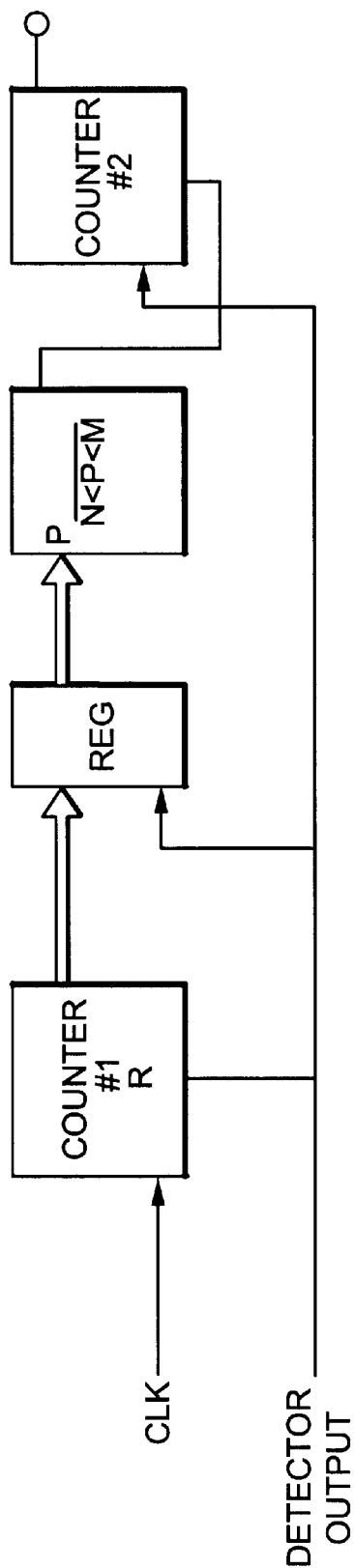
FIG. 10 shows a servo lock logic circuit according to the present invention.
Figure 11:
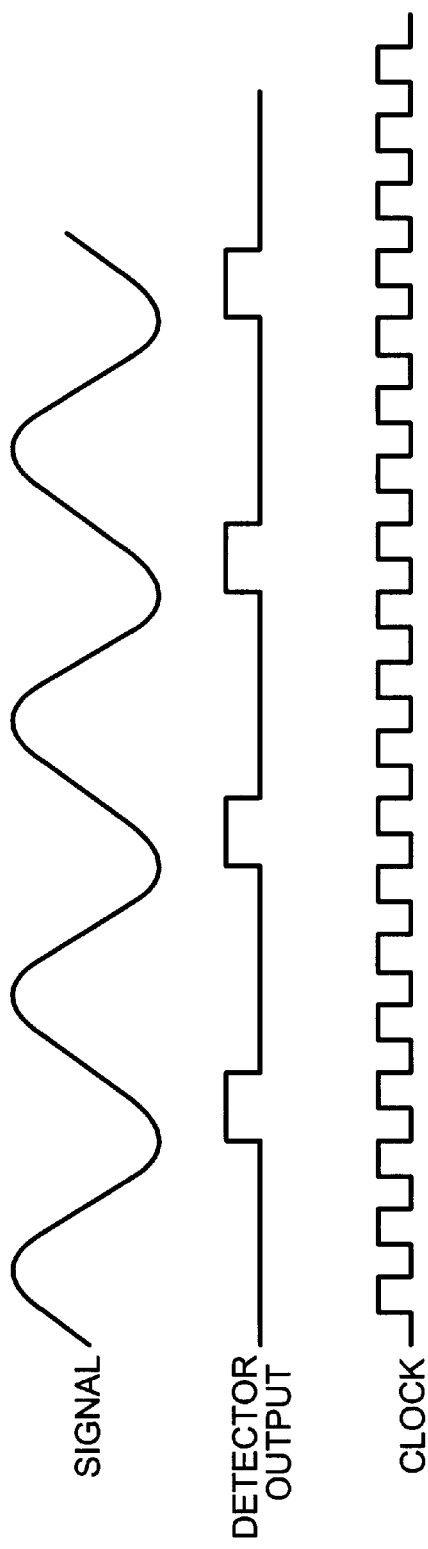
FIG. 11 is a diagram showing preamble, preamble detect and clock signals relevant to the operation of the servo lock logic circuit of FIG. 10.

Referring now to FIG. 10, there is shown an exemplary logic circuit according to the present invention, for detecting a preamble as a condition for qualifying a period of silence as an AM field. FIG. 11 provides signal diagrams of preamble, preamble detect and clock signals relevant to the operation of the logic circuit of FIG. 10. The sine wave depicted at the top of FIG. 11 represents a preamble, as recorded on a disk surface at the beginning of a servo sector. The preamble comprises a fixed number of dibits corresponding to each pair of positive and negative peaks in the sine wave.

Detector Output: Signal A represents a series of pulses that are generated within the disk drive to indicate the detection and qualification of each dibit of the preamble.

Signal A can be generated by a circuit of the type disclosed in co-pending U.S. application Ser. No. 08/448,806, now U.S. Pat. No. 5,608,583, filed May 24, 1995 in the name of Louis J. Shrinkle, entitled SYSTEM FOR QUALIFYING THE DETECTION OF A SERVO DIBIT, and assigned to the assignee of the present application. Application Ser. No. 08/448,806, now U.S. Pat. No. 5,608,583 is hereby expressly incorporated by reference in its entirety, as if repeated herein, but is not repeated for brevity purposes.

Signal B is the disk drive clock, synchronized to signal A. When a head passes over a preamble, there will be a fixed number of A pulses, with a B pulse for each A pulse. Thus, whenever there is a count that corresponds to the fixed number of preamble dibits with the occurrence of an A pulse and a B pulse during each count, there is a high probability that the head has just traversed a preamble. The period of silence that follows will then have a high probability of being an AM field.

The logic circuit of FIG. 10 is an example of a circuit that can initiate and continue a count up to the number of dibits in a preamble, as a function of the occurrence of A and B pulse pairs, one per count, for the duration of the count.

The logic circuit of FIG. 10 includes a first counter 250, a register 252, a comparator 254, and a second counter 256. The first counter 250 receives the clock pulse and the output of the detector. The output of the first counter 250 is fed to the register 252, which also receives the detector output. The output of the register 252 is then fed to the comparator 254, which compares the output of the register to N and M. The output of the comparator 254 is then fed to a second counter 256, which also receives the output of the detector.

The first counter 250 will count up to "4," for example, before being reset. Consequently, "4" will be loaded into the register 252. In this case, for example, N might be equal to "2" and M would then be equal to "6." If the count is $\leq 2$ or $\geq 6$, then the output of the comparator 252 will reset the second counter 256. If the count maintains itself between 2 and 6 for a fixed number of detector pulses, then the second counter 256 will go active, thus arming the AM detection circuit. Typically, a clock 4–8 times faster than the detector output is available.

FIG. 11 depicts the signals input to the circuit of FIG. 10. The input signal to the detector is a sinusoidal signal, which represents the dibits stored on the disk. The output of the detector is shown in FIG. 11, which indicates a square pulse for every cycle of the input signal. As discussed above, the clock signal is four times the detector signal, as shown in FIG. 11.

The final step in the operation is to provide a reliable retract to the inner diameter (ID) at power off. It is desired to perform this retract at $V_{CRIT}$ similar to the seek-out operation at spin-up. It is realized that the actuator can be at any radial position and that an unwanted consequence of the retract operation today is that the velocity can vary widely depending on the actuator position at power-off time. The present invention provides a method for retracting to the landing zone at the critical rotational speed ($V_{CRIT}$) and with a more constant actuator velocity.

Figure 12:
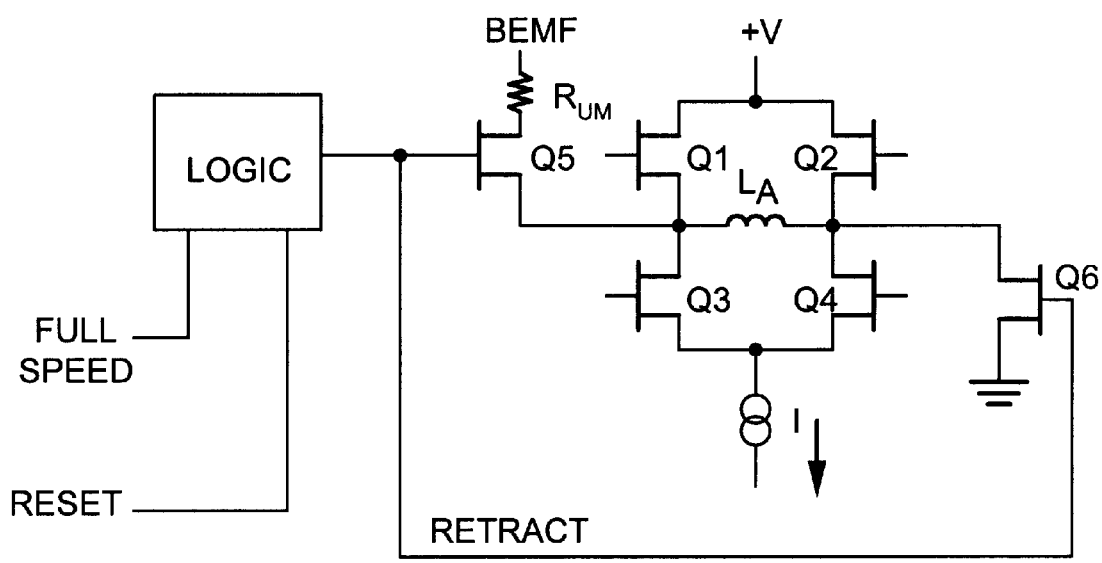
FIG. 12 shows a retract logic control system according to the present invention.

FIG. 12 depicts a simplified circuit of the actuator driver and retract circuitry. FIG. 13 shows the timing of the operation for a normal power-on/off, while FIG. 14 depicts the timing of the operation when power is applied for too short of a period (i.e., full speed is never reached). For a normal power-on, the reset pulse maintains the actuator at the ID (latched) and after reset the actuator stays in that position. When the rotational speed reaches $V_{CRIT}$ the actuator seeks out, as described earlier. When the spindle is at full speed, the line 'FULL SPEED' goes high. This will enable the timer in the logic block of FIG. 12. When power is shut off, the devices Q1, Q2, Q3, Q4 and current source I are shut off. The retract is not enabled. The actuator will 'Drift'0 to nearly the zero skew radius from whatever position it is at.

The timer, which was enabled after full speed was reached, will now command a retract after it has reached its timeout. The logic to do all this must be powered by a source that remains active for some time after the main power is off. This is typically a large capacitor since this logic draws extremely small currents. The timer is set to timeout at a rotational speed that equals $V_{CRIT}$. This is done by characterizing typical motors and head/media during development. The final result is a retract to the CSS zone at $V_{CRIT}$ starting from nearly the same radial position independent of the final track selected before power-down. In the case of shortened power-on, even when $V_{CRIT}$ is reached on spin-up and the actuator seeks out and full speed is not reached, the retract can still be commanded, but in this case no timer is enabled. This will assure retract although possibly not at $V_{CRIT}$. It is assumed that this is not a typical situation and is handled as an emergency case only. Also in the case of latch or retract failure, it is assumed that the lubrication and slight texture in the data area will allow for a very occasional start-up without excessive stiction, or there might be other means to break the stiction.

What is claimed is:

1. In a disk drive including an actuator arm having at least one head mounted thereon, at least one disk having a head contact area for resting the head on the disk when power is removed from the disk drive and a data area for storing information therein, a motor for spinning said disk relative to said head such that said head floats on an air bearing surface above the disk when a rotational velocity of the head relative to the disk exceeds a first takeoff velocity in said head contact area and a second takeoff velocity in said data area, an apparatus for starting up the disk drive, comprising:

a motor controller for controlling the motor to spin the disk relative to the head at a desired rotational velocity; and an actuator controller coupled to said motor controller for controlling the actuator arm to move the head from the head contact area to the data area before the head reaches the first take off velocity in the head contact area after reaching the second takeoff velocity;

a preamble detection circuit providing an arming signal if a fixed number of dibits at a predetermined frequency are detected by the head when the head is in the data area; and an address mark detection circuit qualifying a detected window of silence as an address mark, if the window of silence is detected after the arming signal is received such that a servo lock is obtained.

2. The apparatus as in claim 1 wherein the first takeoff velocity is greater than the second takeoff velocity.

3. The apparatus as in claim 1 wherein the head contact area is textured.

4. The apparatus of claim 1 wherein the preamble detection circuit comprises:

a detector reading dibits from the data area of the disk when the head is located over the data area of the disk and outputting detector pulses corresponding to each dibit;

a first counter counting a number of clock pulses received between detector pulses received from the detector;

a comparator having an output and monitoring the number of clock pulses counted between detector pulses to issue a reset signal via the output if the detector pulses occur outside a common frequency range; and a second counter coupled to the output counting a number of detector pulses sequentially occurring within the common frequency range and asserting the arming signal if the second counter reaches a predetermined threshold.

5. A method for starting up a disk in a drive having a motor for spinning the disk at a velocity and a head for which there is a first takeoff velocity relative to spinning disk in a landing zone and for which there is a second takeoff velocity relative to the spinning disk in a data zone, comprising the steps of:

a) initiating disk spin when the head is positioned over the landing zone;

b) moving the head from the landing zone to the data zone after achieving the second take-off velocity but before achieving the first takeoff velocity;

c) withholding power from the head when the head is positioned over the landing zone;

d) accelerating the velocity of the disk to a full operational velocity as the head is positioned above the data zone;

e) supplying power to the head after the velocity of the disk reaches the full operational velocity with said head over the data zone;

f) reading from the disk with the head over the data zone; and g) servo locking to a track at the first radial position in the data zone, if the head detects a fixed number of dibits at a predetermined frequency followed by a period of silence in reading step (f).

6. The method as in claim 5 wherein the first takeoff velocity is greater than the second takeoff velocity.

7. The method as in claim 5 wherein the landing zone is textured.

8. A method for performing a contact start operation in a disk drive, which includes at least one head, and at least one disk having a textured landing zone and a data zone for which there are first and second takeoff velocities respectively, comprising the steps of:

a) increasing a rotational velocity of the disk while the head is parked in the textured landing zone until the rotational velocity reaches a first speed, which is at least equal to the second takeoff velocity;

b) moving the head from the textured landing zone to the data zone before the rotational velocity reaches the first take-off velocity;

c) withholding power from the head when the head is positioned over the landing zone;

d) accelerating the velocity of the disk to a full operational velocity as the head is positioned above the data zone;

e) supplying power to the head after the velocity of the disk reaches the full operational velocity with the head over the data zone;

f) providing an arming signal in a preamble detection circuit if a fixed number of dibits are detected at a predetermined frequency in the data zone; and g) qualifying a detected window of silence as an address mark, if the window of silence is detected after the arming signal is received.

9. The method as in claim 8 wherein the first takeoff velocity is greater than the second takeoff velocity.

10. A method for moving a head mounted on an actuator arm in a disk drive from a textured landing zone to a non-textured data zone after power-up, comprising the step of:

a) beginning an initial seek operation out of the landing zone at a rotational velocity of the disk such that the head is still dragging on the surface of the landing zone, but is instantly at fly height when the head reaches the data zone;

b) withholding power from the head when the head is positioned over the landing zone;

c) accelerating the velocity of the disk to a full operational velocity as the head is positioned above the data zone;

d) supplying power to the head after the velocity of the disk reaches the full operational velocity with the head over the data zone;

e) providing an arming signal in a preamble detection circuit if a fixed number of dibits at a predetermined frequency are detected in the data zone by the head; and f) qualifying a detected window of silence as an address mark, if the window of silence is detected after the arming signal is received.

* * * * *